United States Patent
Jensen

(10) Patent No.: US 11,152,719 B2
(45) Date of Patent: Oct. 19, 2021

(54) ELECTROMAGNETIC GROUNDING ARRANGEMENT

(71) Applicant: Siemens Gamesa Renewable Energy A/S, Brande (DK)

(72) Inventor: Henrik Abild Jensen, Viborg (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/840,535

(22) Filed: Apr. 6, 2020

(65) Prior Publication Data

US 2020/0328538 A1 Oct. 15, 2020

(30) Foreign Application Priority Data

Apr. 9, 2019 (EP) .................................... 19168180

(51) Int. Cl.
| | |
|---|---|
| H01R 4/66 | (2006.01) |
| F03D 13/20 | (2016.01) |
| E02D 27/42 | (2006.01) |
| H01B 9/02 | (2006.01) |
| H01B 13/00 | (2006.01) |

(52) U.S. Cl.
CPC ............. *H01R 4/66* (2013.01); *E02D 27/425* (2013.01); *F03D 13/22* (2016.05); *H01B 9/02* (2013.01); *H01B 13/0036* (2013.01)

(58) Field of Classification Search
CPC ........................................................ H01R 4/66
USPC ........................................................ 174/70 R
See application file for complete search history.

(56) References Cited

U.S. PATENT DOCUMENTS

| | | | |
|---|---|---|---|
| 7,455,534 B1* | 11/2008 | Fredericksen | ......... H01R 4/646 439/92 |
| 2006/0234547 A1* | 10/2006 | Shimizu | ............... H01R 9/0524 439/585 |
| 2011/0027100 A1 | 2/2011 | Cummane et al. | |
| 2015/0143765 A1* | 5/2015 | Carril Gonzalez | ... E04B 1/4114 52/296 |

FOREIGN PATENT DOCUMENTS

| | | | | |
|---|---|---|---|---|
| WO | 2007134599 A1 | 11/2007 | | |
| WO | WO 2007/134599 | * | 11/2007 | ............. H02G 13/00 |

OTHER PUBLICATIONS

Lorentzou M I et al: "Analysis of wind turbine grounding systems", Electrotechnical Conference, 2000. MELECON 2000. 10th Mediterranean May 29-31, 2000, Piscataway, NJ, USA, IEEE, vol. 3, pp. 936-939, XP010518597, ISBN: 978-0-7803-6290-1; Abstract; Paragraphs [0003], [0004], [0006]; 2000.

European Search Report and Written Opinion of the European Searching Authority dated Oct. 22, 2019 for Application No. 19168180.8.

* cited by examiner

*Primary Examiner* — Stanley Tso
(74) *Attorney, Agent, or Firm* — Schmeiser, Olsen & Watts LLP

(57) ABSTRACT

Provided is an electromagnetic grounding arrangement for power cables of a wind turbine that includes a tower mounted on a foundation, which electromagnetic grounding arrangement includes an electrically conductive sheet including at least one aperture through which a power cable passes; a first current path from a jacket of the power cable to the electrically conductive sheet; and a second current path from the electrically conductive sheet to ground.

12 Claims, 4 Drawing Sheets

ELECTROMAGNETIC GROUNDING ARRANGEMENT

CROSS-REFERENCE TO RELATED APPLICATIONS

This application claims priority to European Application No. 19168180.8, having a filing date of Apr. 9, 2019, the entire contents of which are hereby incorporated by reference.

FIELD OF TECHNOLOGY

The following describes an electromagnetic grounding arrangement and a method of reducing electromagnetic emissions arising from power cables of a wind turbine.

BACKGROUND

It is known that electromagnetic emissions from one source can interfere with correct operation of other equipment. For large generators such as wind turbines, electromagnetic emissions can be significant, and may typically arise from rapid fluctuations in current and voltage in the high-voltage power cables that connect the wind turbine to the grid. It is mandatory for a wind turbine to fulfil certain requirements in order to obtain EMC (electromagnetic compatibility) certification. Without such certification, installation will be refused in certain countries or regions such as the EU.

In a conventional art approach to reducing the electromagnetic emissions from the power cables of a wind turbine, an electrically conducting bridge is used to connect the outer jackets or cable shields of the power cables to ground. However, if this is not done correctly, the level of cable-conducted electromagnetic emissions can be significant.

SUMMARY

An aspect relates to a way of reducing the electromagnetic emissions arising from power cables of a wind turbine.

According to embodiments of the invention, the electromagnetic grounding arrangement for wind turbine power cables comprises an electrically conductive sheet comprising at least one aperture through which a power cable can pass; a first current path from a power cable jacket to the electrically conductive sheet; and a second current path from the electrically conductive sheet to ground.

A power cable in the context of embodiments of the invention may be any of an ingoing cable or an outgoing cable. Such a power cable is generally a multi-layer power cable comprising one or more electrical conductors in the interior that are protected by various sheath layers. The expression "power cable jacket" is to be understood as the outer layer of a multi-layer power cable. In the context of embodiments of the invention, it shall be understood that the aperture through which the power cable can pass is formed such that there is physical contact between the power cable jacket and the sheet over the circumference of the power cable. Any electrical connection between a power cable jacket and ground will reduce the electromagnetic field that develops about the power cable. The inventive grounding arrangement provides a significant improvement to the conventional art, because the electrical connection between the power cable jacket and the sheet extends over the entire circumference of the power cable, i.e. the power cable jacket is connected to the sheet over 360°.

The power cables of a wind turbine are generally suspended from the top of the tower, and the lower ends of the power cables are essentially vertical when they pass into the foundation, i.e. into the tower floor. Therefore, without restricting embodiments of the invention in any way, it may be assumed that the electrically conductive sheet is horizontal, i.e. that the plane of the sheet is essentially perpendicular to the power cables.

According to embodiments of the invention, a wind turbine comprises a tower mounted onto a foundation; a number of power cables arranged to pass between the tower and the foundation; and an embodiment of the inventive electromagnetic grounding arrangement, arranged at the tower/foundation transition.

The inventive method of reducing electromagnetic emissions arising from power cables of a wind turbine comprises the steps of providing an electrically conductive sheet; forming at least one aperture to permit a power cable to pass through the electrically conductive sheet; electrically connecting the power cable jacket to the conductive sheet; and electrically connecting the conductive sheet to ground.

Particularly advantageous embodiments and features of the invention are given by the dependent claims, as revealed in the following description. Features of different claim categories may be combined as appropriate to give further embodiments not described herein.

The electrically conductive sheet may be installed at any suitable level in the wind turbine tower, for example at a level between any pair of sections in a segmented tower. However, in a particularly preferred embodiment of the invention, the sheet is arranged at the transition between tower and foundation. In such a preferred embodiment, the electrically conductive sheet extends to fill the (generally circular) cross-sectional area at the base of the tower. The sheet can be embedded in the uppermost concrete layer of the foundation prior to erecting the tower, for example. Alternatively, the sheet can be placed over the previously prepared foundation, allowing an already installed wind turbine to be retro-fitted with the inventive EM grounding arrangement.

In the following, without restricting embodiments of the invention in any way, it may be assumed that the wind turbine tower is mounted on a concrete foundation. The base of a wind turbine tower is generally attached to a concrete foundation by means of a flange placed underneath the tower. One or two rings of vertical bolts embedded in the concrete may be used to secure the flange to the foundation. These elements are usually made of steel and are generally grounded in order to avoid flashovers during a lightning strike. Therefore, in a preferred embodiment of the invention, the electrically conductive sheet is connected to the tower flange in order to ground the sheet.

In a particularly preferred embodiment of the invention, the electrically conductive sheet is provided in the form of a metal mesh. Without restricting embodiments of the invention in any way, the electrically conductive sheet may simply be referred to as a "mesh" in the following. The mesh may be made from wire such as stainless steel wire or copper wire, may be with a wire thickness in the range 5 mm-8 mm. The mesh is made to have a mesh size in the range 50 mm-100 mm. To protect the mesh from damage, the wires may be given a suitable covering such as nylon. The apertures can be formed by cutting suitably sized holes in the mesh, or by cutting some wires and bending the cut ends outward to form the desired aperture shape.

The second current path, i.e. the electrical connection between mesh and ground, can be achieved by connecting the mesh to a grounding path of the wind turbine, for example to a down-conductor of the wind turbine's lighting protection system (LPS) or to structurally reinforcing elements embedded in the foundation that are grounded. For example, wires of the mesh can be wrapped around or clamped to the steel bolts extending between an anchor ring (embedded in the foundation) and the tower flange.

The inventive grounding arrangement ensures that the power cable jackets are terminated at foundation entry level. This termination is very effective, since a power cable jacket can make contact with the electrically conductive mesh over its entire circumference, i.e. over 360°. Since the mesh fills the entire cross-sectional area inside the tower, it may be regarded as the "floor" of a Faraday cage. The correct termination of the power cable jackets and the Faraday cage effect contribute to a significant reduction in electromagnetic emissions, and make an important contribution to the EMC of the wind turbine.

The first current path, i.e. the electrical connection between the mesh and the power cable jacket, may be made in any suitable way. In a preferred embodiment, a first connection means comprises a metal sleeve or tube dimensioned to fit about a power cable. The aperture in the sheet or mesh is formed to maximize the physical contact between the cut ends of the mesh and the metal sleeve. In a further preferred embodiment, the metal sleeve or tube can be provided with an outward-extending flange, which can be secured to the edge of the aperture, for example by welding cut wire ends to the flange, or by crimping or clamping to press the wires of the mesh to the flange.

As mentioned above, a multi-layer power cable has an outer protective jacket, usually made of a thermoplastic material such as polyvinyl chloride (PVC). A shielded high-voltage power cable also includes an electrically conductive sheath (or "common conductive layer") under the outer jacket. In a particularly preferred embodiment of the invention, the outer jacket of a power cable is cut to expose the electrically conductive sheath, which is then electrically connected to the mesh of the inventive electromagnetic grounding arrangement. To this end, the exposed sheath is turned down to lie over the upper end of the metal tube of the first connection means, and a hose clamp is tightened about the exposed power cable sheath cable to make a secure physical and electrical connection to the metal tube, and therefore also to ground as explained above.

Generally, a wind turbine will have several outgoing power transmission cables as well as a number of incoming cables (e.g. one or more communication cables). A wind turbine that is part of a wind park will also have several incoming power transmission cables. In the inventive electromagnetic grounding arrangement, each power cable passes through an aperture in the mesh and its outer jacket (or exposed conductive shield as described above) is electrically connected to the mesh. In a preferred embodiment of the invention, the first connection means comprises a metal bracket that is electrically connected to the mesh, and which can be electrically connected to the outer jackets (or exposed conductive shields as described above) of several power cables.

Other objects and features of embodiments of the present invention will become apparent from the following detailed descriptions considered in conjunction with the accompanying drawings. It is to be understood, however, that the drawings are designed solely for the purposes of illustration and not as a definition of the limits of embodiments of the invention.

FIELD OF TECHNOLOGY

Some of the embodiments will be described in detail, with references to the following Figures, wherein like designations denote like members, wherein.

DETAILED DESCRIPTION

Figure 1:
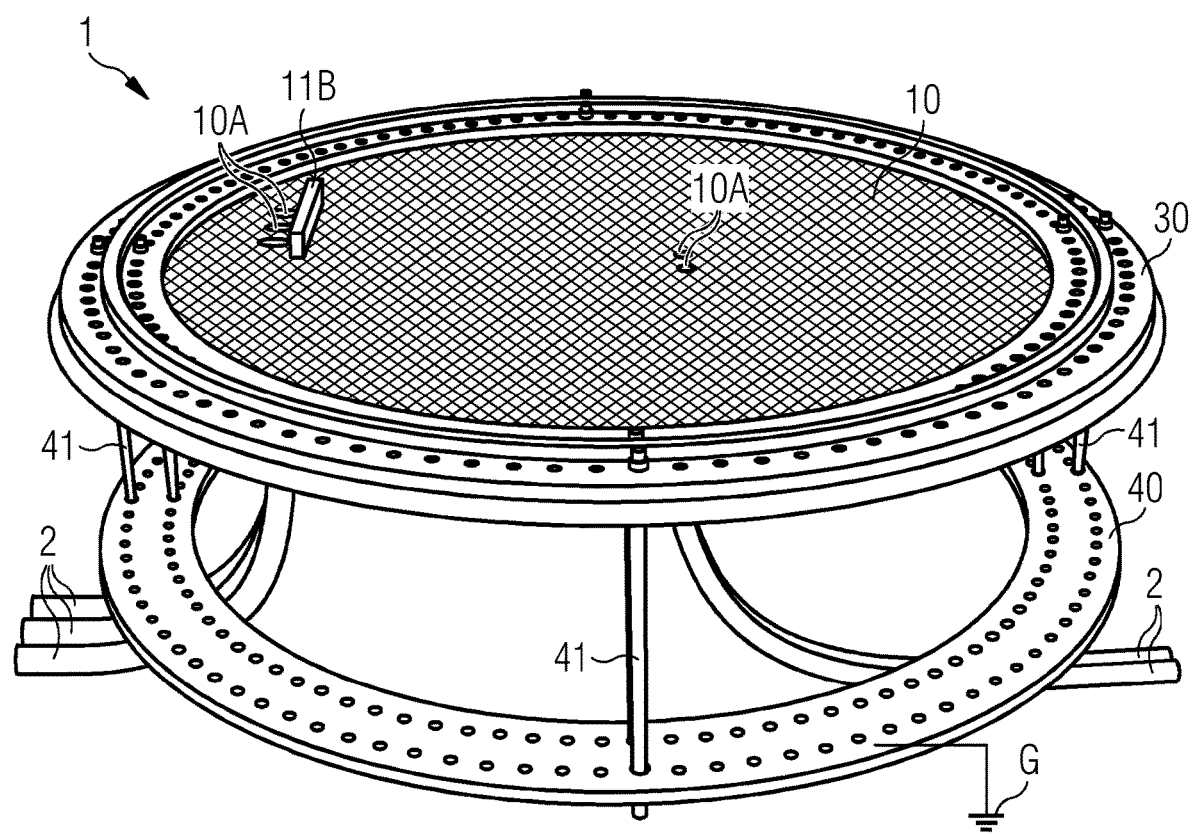
FIG. 1 shows an embodiment of an electromagnetic grounding arrangement.

FIG. 1 shows an embodiment of the inventive electromagnetic grounding arrangement 1. The diagram shows a tower flange 30 used to mount a tower (not shown) to a foundation (not shown). The tower flange 30 is connected to a ring anchor 40 by means of anchor bolts 41, of which a few are shown. This structure is embedded in concrete when the foundation is prepared. The diagram also shows an electrically conductive sheet 10 that fills the circular area defined by the tower flange 30. The area of the electrically conductive sheet 10 can exceed the area defined by the inner diameter of the tower flange 30, and may exceed the area defined by the outer diameter of the tower flange 30. The anchor bolts 41 may pass through openings in the sheet 10. The sheet 10 may be electrically connected to the flange 30 and/or to the anchor bolts 41 in order to achieve an electrical connection between the sheet 10 and ground G. The diagram also shows a number of apertures 10A formed in the sheet 10. Each aperture 10A is provided at the point where a power cable 2 will pass from the foundation into the tower interior. In this embodiment, apertures are formed for three outgoing high-voltage transmission cables 2 (at the left) and two incoming power cables 2 (at the right). The diagram also shows a metal bracket 11B that will be used to electrically connect an outer layer of each transmission cable 2 to the sheet 10. Even if the mesh 10 is covered in the final layer of concrete, the bracket 11B can be left to protrude above the floor level, so that the power cable jackets can later be electrically connected to the bracket 11B.

Figure 2:
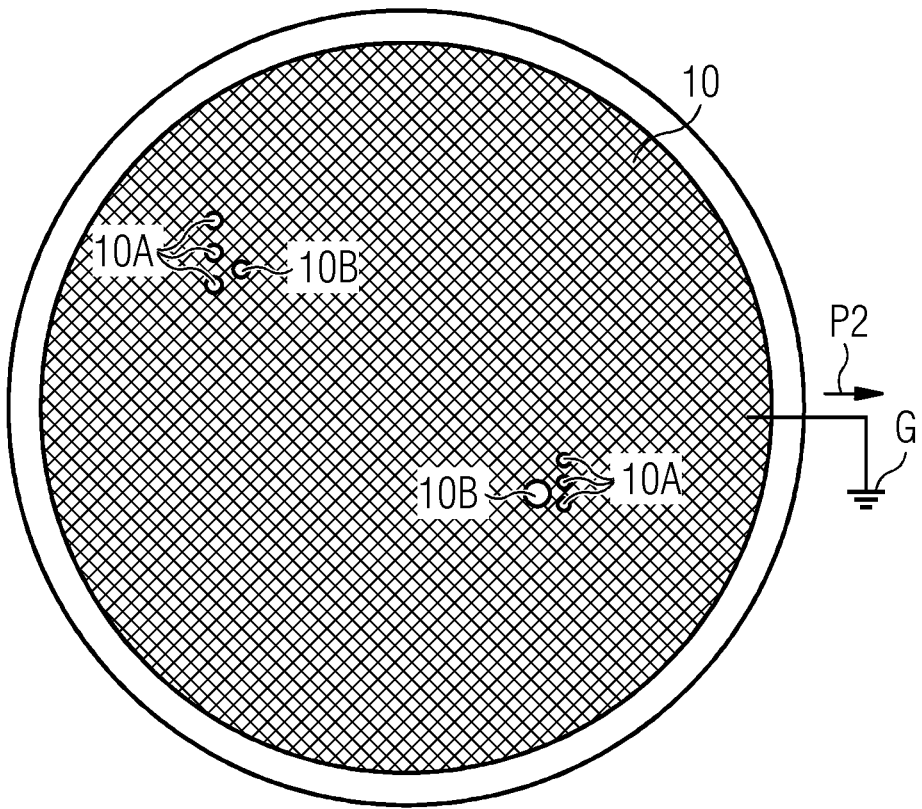
FIG. 2 shows a simplified plan view of an embodiment of the electromagnetic grounding arrangement.

FIG. 2 shows a plan view of the sheet 10, indicating a preferred realization as a metal wire mesh, and indicating the positions of apertures 10A for power cables, and additional apertures 10C to facilitate a first connection means as will be explained below. It may be assumed that the mesh 10 is connected to electrical ground G, for example in the manner described above, and indicated by a current path P2 in the diagram.

Figure 3:
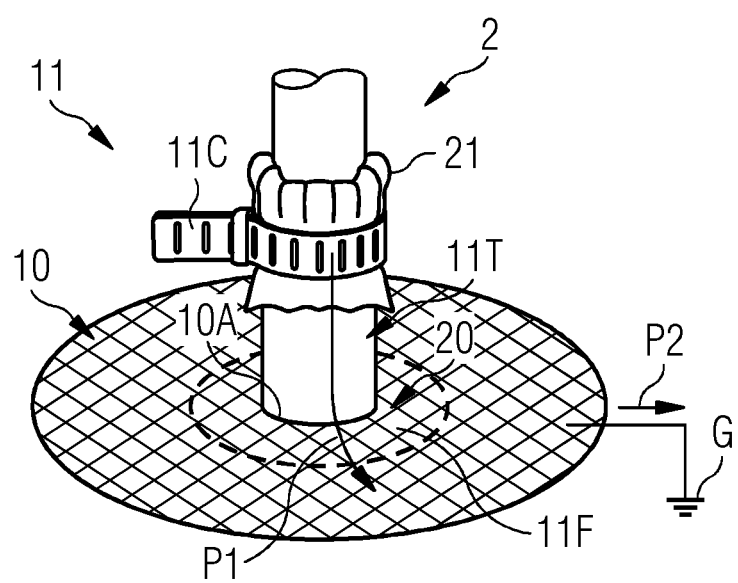
FIG. 3 shows part of a first connection means in an embodiment of the electromagnetic grounding arrangement.

FIG. 3 shows part of a first connection means 11 in an exemplary embodiment. Again, it may be assumed that the mesh 10 is connected to ground G, for example in the manner described above. Here, a metal tube 11T has been placed over the power cable 2. The metal tube 11T has a flange 11F that is arranged underneath the mesh 10 so that the tube portion extends upward through the aperture 10A in the mesh 10. The power cable outer jacket 20 has been cut to expose a sheath 21, which is also cut about the circumference of the cable so that the cut sheath can be turned downwards to lie over the upper end of the metal tube 11T.

A metal hose clamp 11C is tightened about the turned-down section of the sheath, so that a good electrical connection—indicated as first current path P1—is formed between the sheath 21 and the mesh 10. Current finds its way to ground over the second current path P2 explained in FIG. 2 above.

Figure 4:
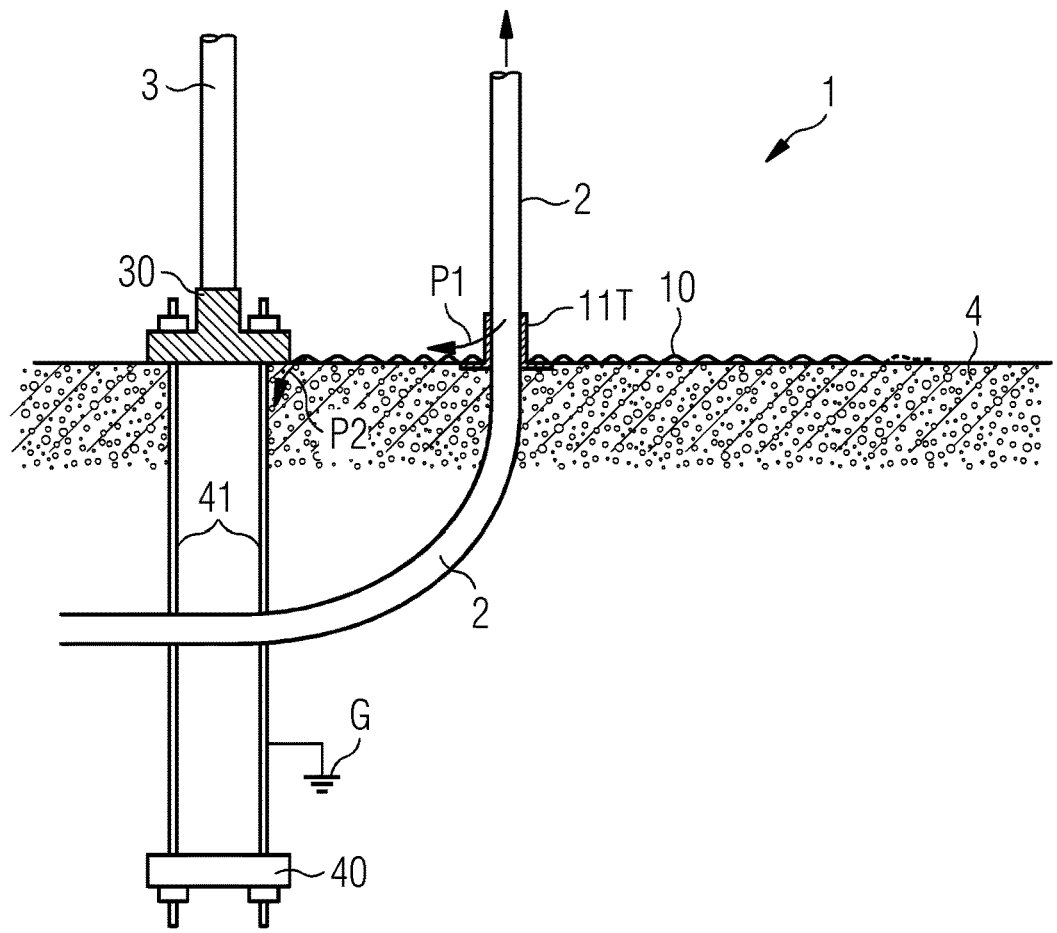
FIG. 4 shows a first cross-section through an embodiment of the electromagnetic grounding arrangement.

FIG. 4 shows a cross-section through an embodiment of the inventive electromagnetic grounding arrangement 1. The diagram shows a transmission cable 2 extending upward from the foundation 4 through an aperture 10A in the mesh 10. Any such transmission cable 2 or other power cable 2 can be electrically connected to the mesh 10 as described in FIG. 3 above, indicated by current path P1, and this diagram indicates a metal tube 11T extending through an aperture in the mesh 10 to act as a sleeve about the power cable 2. Here, the mesh 10 is arranged to lie on the upper surface of the foundation 4 and is electrically connected to the flange 30. The weight of the tower 3 may press the flange 30 onto the outer border of the mesh 10, thereby connecting the mesh 10 to ground, since the flange 30 is also connected to ground G in the usual manner. This is indicated by current path P2.

Figure 5:
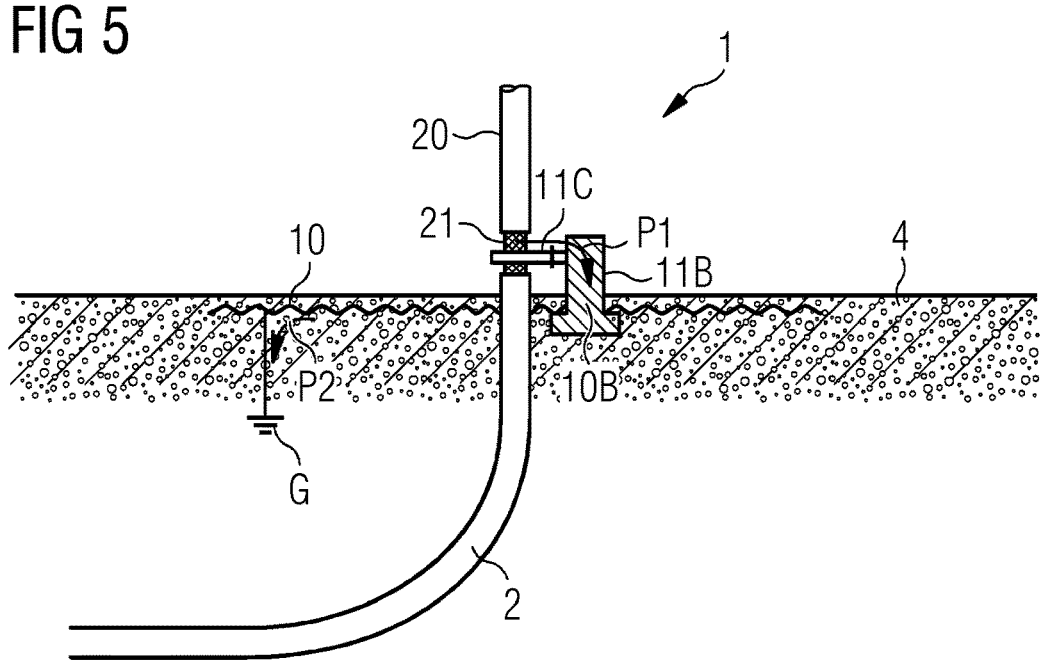
FIG. 5 shows a second cross-section through an embodiment of the electromagnetic grounding arrangement.

FIG. 5 shows a cross-section through a further embodiment of the inventive electromagnetic grounding arrangement 1. Here, the mesh 10 is embedded in an upper layer of the foundation 4 and is electrically connected to ground G via current path P2, for example through the ring bolts or ring anchor (not shown). The diagram shows a transmission cable 2 extending upward from the foundation 4 through an aperture 10A in the mesh 10. The diagram also shows a bracket 11B with a foot that extends through an aperture 10B in the mesh, and which is also electrically connected to the mesh 10. Any transmission cable 2 or other power cable 2 can be electrically connected to the mesh 10 over current path P1 by means of the bracket 11B. A power cable 2 can be secured to the bracket 11B by a hose clamp 11C tightened about the power cable jacket 20, or by a hose clamp 11C tightened about an exposed shielding layer 21 of the power cable 2, as shown here. Several power cables 2 can be connected to the bracket 11B in this way, although only one is shown here for the sake of clarity.

Figure 6:
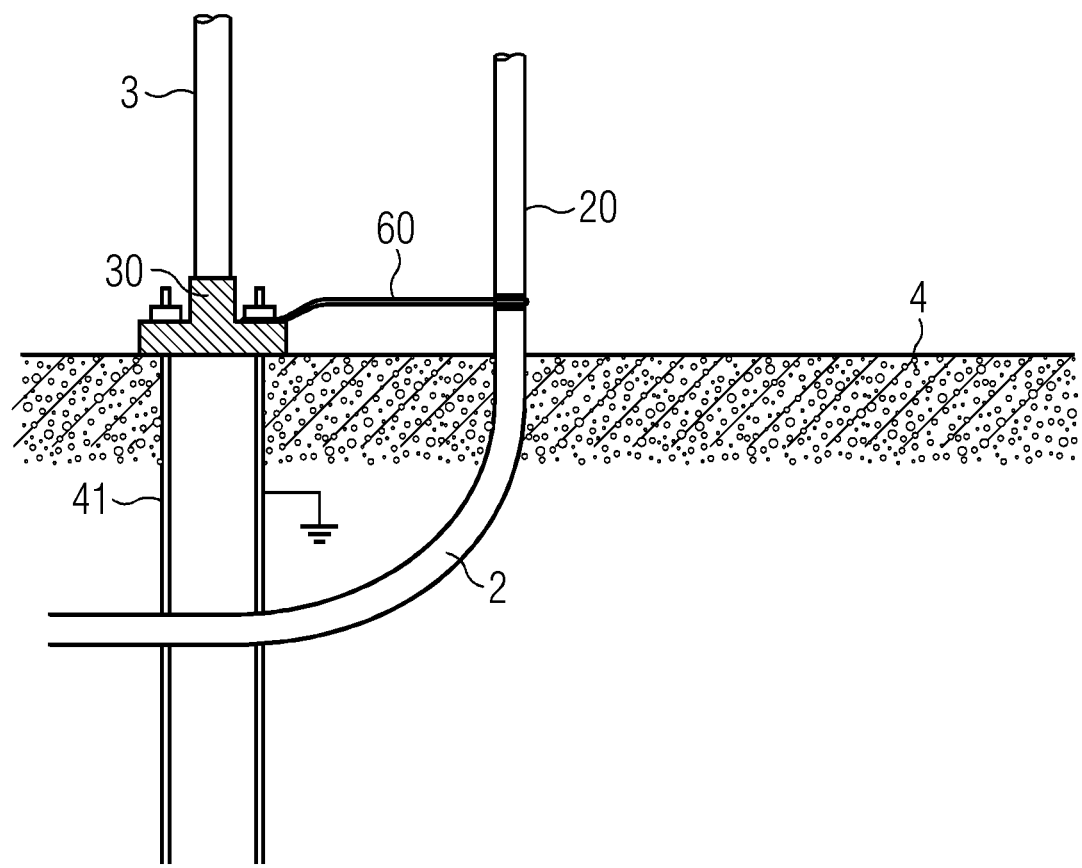
FIG. 6 shows a conventional art electromagnetic grounding arrangement.

FIG. 6 shows a conventional art electromagnetic grounding arrangement at the transition between foundation 4 and tower 3 of a wind turbine. Here, a wire 2 is secured about a power cable 2 and electrically connected to the tower flange 30. This type of grounding is only of limited effectiveness, since any electromagnetic field arising from the power cable 2 will surround the power cable 2 on all sides, and the wire connection is limited to one direction.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electromagnetic grounding arrangement for power cables of a wind turbine that comprises a tower mounted on a foundation, the electromagnetic grounding arrangement comprising:
   an electrically conductive sheet comprising at least one aperture through which a power cable passes;
   a first current path formed by an electrical connection between a jacket of the power cable and the electrically conductive sheet, the jacket being connected to the electrically conductive sheet over an entire circumference of the power cable; and
   a second current path from the electrically conductive sheet to ground;
   wherein the electrically conductive sheet is a metal mesh;
   wherein the first current path is effected by an electrically conductive tube dimensioned to fit about the power cable;
   wherein the electrically conductive tube comprises a metal flange extending outward from a base of the electrically conductive tube connected to the electrically conductive sheet.

2. The electromagnetic grounding arrangement according to claim 1, wherein the electrically conductive sheet extends to fill a cross-sectional area of the tower.

3. The electromagnetic grounding arrangement according to claim 1, comprising a metal hose clamp arranged to secure a shielding layer of the power cable to the electrically conductive metal tube.

4. The electromagnetic grounding arrangement according to claim 1, comprising a metal bracket attached to the electrically conductive sheet and to the power cable.

5. The electromagnetic grounding arrangement according to claim 1, wherein the electrically conductive sheet comprises a plurality of apertures for a corresponding plurality of power cables.

6. The electromagnetic grounding arrangement according to claim 1, wherein the second current path is effected by connecting the electrically conductive sheet to a metal tower flange disposed between the tower and the foundation.

7. The electromagnetic grounding arrangement according to claim 1, wherein the electrically conductive sheet is embedded in an upper level of the foundation.

8. The electromagnetic grounding arrangement according to claim 1, wherein the second current path is effected by at least one of: connecting the electrically conductive sheet to an electrically conductive structure embedded in a wall of the tower, and connecting the electrically conductive sheet to an electrically conductive structure embedded in the foundation.

9. A wind turbine comprising
   a tower mounted onto a foundation;
   at least one power cable arranged to pass between the tower and the foundation; and
   the electromagnetic grounding arrangement according to claim 1, arranged to provide a current path to ground from a jacket of the power cable.

10. A method of reducing electromagnetic emissions arising from power cables of a wind turbine, of the method comprising:
    providing an electrically conductive sheet, wherein the electrically conductive sheet is a metal mesh;
    forming at least one aperture to permit a power cable to pass through the electrically conductive sheet;
    electrically connecting a power cable jacket to the electrically conductive sheet such that the jacket is connected to the electrically conductive sheet over an entire circumference of the power cable thereby forming a first current path; and
    connecting the electrically conductive sheet to ground, thereby forming a second current path;
    wherein the first current path is effected by an electrically conductive tube dimensioned to fit about the power cable;

wherein the electrically conductive tube comprises a metal flange extending outward from a base of the electrically conductive tube connected to the electrically conductive sheet.

11. The method according to claim 10, further comprising electrically connecting a power cable shield to the electrically conductive sheet.

12. The method according to claim 10, further comprising embedding the electrically conductive sheet in an upper layer of the foundation.

* * * * *